United States Patent [19]

Rieger et al.

[11] Patent Number: 6,016,324

[45] Date of Patent: Jan. 18, 2000

[54] SHORT PULSE LASER SYSTEM

[75] Inventors: Harry Rieger; Henry Shields, both of San Diego; Richard Foster, Manhattan Beach, all of Calif.

[73] Assignee: JMAR Research, Inc., San Diego, Calif.

[21] Appl. No.: 09/058,274

[22] Filed: Apr. 9, 1998

Related U.S. Application Data

[63] Continuation-in-part of application No. 08/725,750, Oct. 4, 1996, Pat. No. 5,742,634, which is a continuation-in-part of application No. 08/503,373, Jul. 17, 1995, abandoned, which is a continuation-in-part of application No. 08/295,283, Aug. 24, 1994, Pat. No. 5,434,875, and a continuation-in-part of application No. 08/339,755, Nov. 15, 1994, Pat. No. 5,491,707, and a continuation-in-part of application No. 08/429,589, Apr. 27, 1995, abandoned.

[51] Int. Cl.[7] ....................................................... H01S 3/10
[52] U.S. Cl. ................... 372/25; 372/10; 372/18; 372/31; 372/75; 372/103; 372/106
[58] Field of Search ................................... 372/25, 69, 92, 372/103, 108, 27, 75, 5, 31, 18, 106

[56] References Cited

U.S. PATENT DOCUMENTS

| | | | |
|---|---|---|---|
| 4,630,275 | 12/1986 | Rapoport | 372/25 |
| 4,930,901 | 6/1990 | Johnson et al. | 372/25 |
| 5,140,600 | 8/1992 | Rebhan | 372/25 |
| 5,339,323 | 8/1994 | Hunter et al. | 372/25 |
| 5,742,834 | 4/1998 | Rieger et al. | 372/25 |

*Primary Examiner*—Leon Scott, Jr.
*Attorney, Agent, or Firm*—Baker & McKenzie

[57] ABSTRACT

A laser system which generates short duration pulses, such as under five nanoseconds at an energy level of up to a few milli-Joules per pulse (mJ/p) with near diffraction limited beam quality. A laser crystal is pumped (excited) by diode lasers. A resonator having at least two mirror surfaces defines a beam path passing through the laser crystal. The beam path in the resonator is periodically blocked by a first optical shutter permitting pump energy to build up in the laser crystal, except for a short period near the end of each pumping period. While the first optical shutter is open a second optical shutter blocks the light in the resonator except for periodic short intervals, the intervals being spaced such that at least one light pulse traveling at the speed of light in the resonator is able to make a plurality of transits through the resonator, increasing in intensity by extracting energy from the excited laser crystal on each transit. After the light pulse has built up in intensity, an optical release mechanism releases the pulse from resonator.

23 Claims, 7 Drawing Sheets

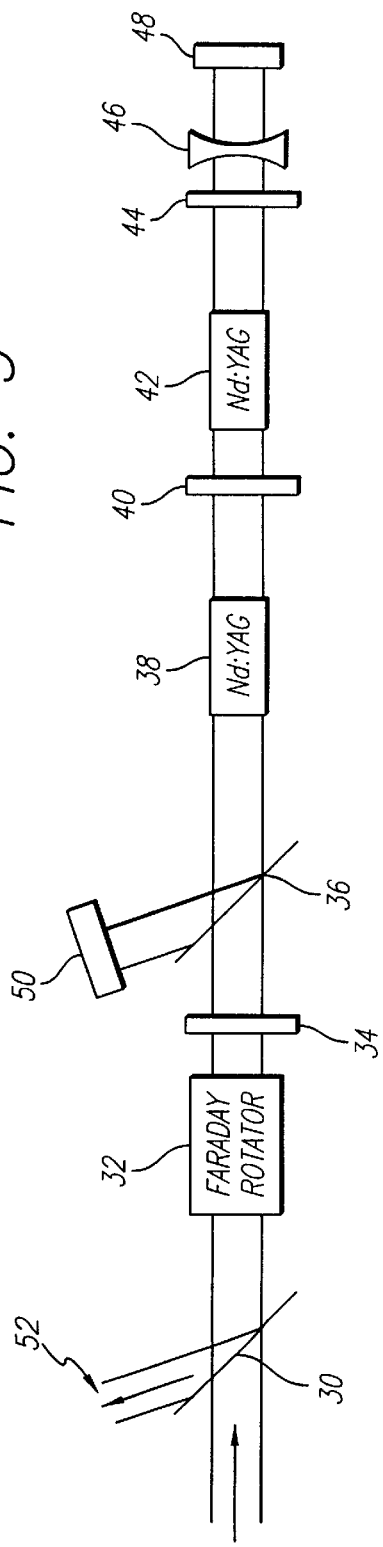
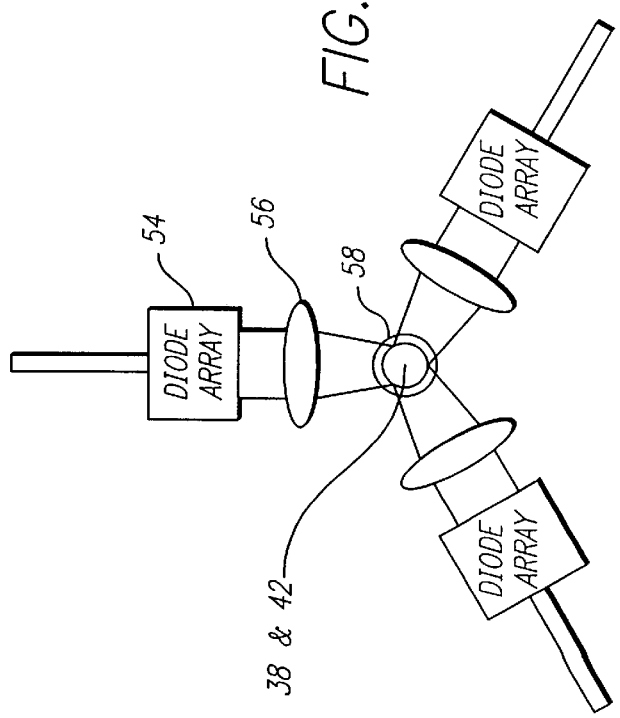

SHORT PULSE LASER SYSTEM

This application is a continuation-in-part of U.S. patent application Ser. No. 08/725,750, filed Oct. 4, 1996 and issued Apr. 21, 1998, as U.S. Pat. No. 5,742,634, which is a continuation-in-part of U.S. patent application Ser. No. 08/503,373, filed Jul. 17, 1995 and now abandoned, which is a continuation-in-part of U.S. patent application Ser. No. 08/295,283, filed Aug. 24, 1994 and now issued as U.S. Pat. No. 5,434,875, and U.S. patent application Ser. No. 08/339,755, filed Nov. 15, 1994 and now issued as U.S. Pat. No. 5,491,707, and U.S. patent application Ser. No. 08/429,589, filed Apr. 27, 1995 and now abandoned.

FIELD OF THE INVENTION

This invention relates to laser systems.

BACKGROUND OF THE INVENTION

Lasers with short pulse duration with high beam quality are very useful for many applications that require high brightness (e.g. material removal for micro-machining, x-ray generation, efficient non-linear processes, etc.). The most common method for generating short pulses in solid state lasers is a method known as Q-switching. The pulse duration of a conventional Q-switched lasers range from ~5 ns to ~200 ns. These pulses can be further shortened using a high gain, very short resonator. Using such methods can generate sub nanosecond pulses at micro-Joule level. Mode locking is another known method for generating short pulse duration. In mode locked lasers the pulse duration can be generated in a variety of ranges, for example ~100 fs to ~300 ps. Mode locked lasers generate continuous or semi-continuous pulse trains, and the energy per single picosecond pulse is on the order of nano-Joule. Many applications require energy per pulse (not pulse train) in the range of ~1 to ~300 mJ;. therefore, the above methods require beam amplification in the range of ~$10^3$ to ~$10^8$. Regenerative or multi-stage amplification can provide the high gain, but such amplifiers are very expensive and/or complex for practical commercial systems.

From the above, it is apparent that there is a need for a better laser system for producing a very short pulse duration at a mJ/pulse energy level.

SUMMARY OF THE INVENTION

The present invention provides a laser system which generates relatively short duration pulses at sufficient energy levels to satisfy applications requiring high brightness pulses. For example, the pulses have a duration under 5000 picoseconds (ps), and preferably in a range of about 10 to 1500 ps, at energy levels of up to a few milli-Joules per pulse (mJ/p) with near diffraction limited beam quality.

In the preferred embodiment, a laser crystal is pumped (excited) by diode lasers. A resonator having at least two mirror surfaces defines a beam path passing through the laser crystal. The beam path in the resonator is periodically blocked by a first optical shutter permitting pump energy to build up in the laser crystal, except for a short period near the end of each pumping period. While the first optical shutter is open a second optical shutter blocks the light in the resonator except for periodic intervals corresponding to the pulse duration, the intervals being spaced such that at least one light pulse traveling at the speed of light in the resonator is able to make a plurality of transits through the resonator, increasing in intensity by extracting energy from the excited laser crystal on each transit. After the light pulse has built up in intensity, an optical release mechanism releases the pulse from resonator.

In a preferred embodiment, the crystal is a Nd:YAG rod pumped by a laser diode array. The resonator is composed of two reflecting mirrors and a polarization beam splitter. The first optical shutter is an acousto-optic Q-switch. The second optical shutter includes an acousto-optic mode locker. The optical release mechanism includes a Pockels cell which rotates the polarization of the pulse from S to P to permit the pulse to be released from said resonator through the polarization beam splitter.

In other preferred embodiments laser amplifiers are described for amplifying the pulsed laser beam produced by the above laser system. Pulsed laser beams with energy levels in excess of 250 mJ per pulse have been achieved. Amplifier designs are described for ~50 and 250 mJ/p at 1000 Hz. The laser system operates below the self focusing limit (B-integral), and at the saturation fluence for efficient extraction of the energy from the laser medium. Implementing this high brightness laser for nonlinear optical processes, micro-machining and more, makes it a very powerful and desirable technology.

BRIEF DESCRIPTION OF THE DRAWINGS

FIG. 1A is a drawing showing a 150 ps pulse.

FIG. 3 is a drawing showing a four passes 250 mJ/p power amplifier configuration.

FIG. 4 is a drawing showing the 250 mJ/p power amplifier pumping configuration.

DETAILED DESCRIPTION OF THE INVENTION

SHORT PULSE LASER SYSTEM

Figure 1:
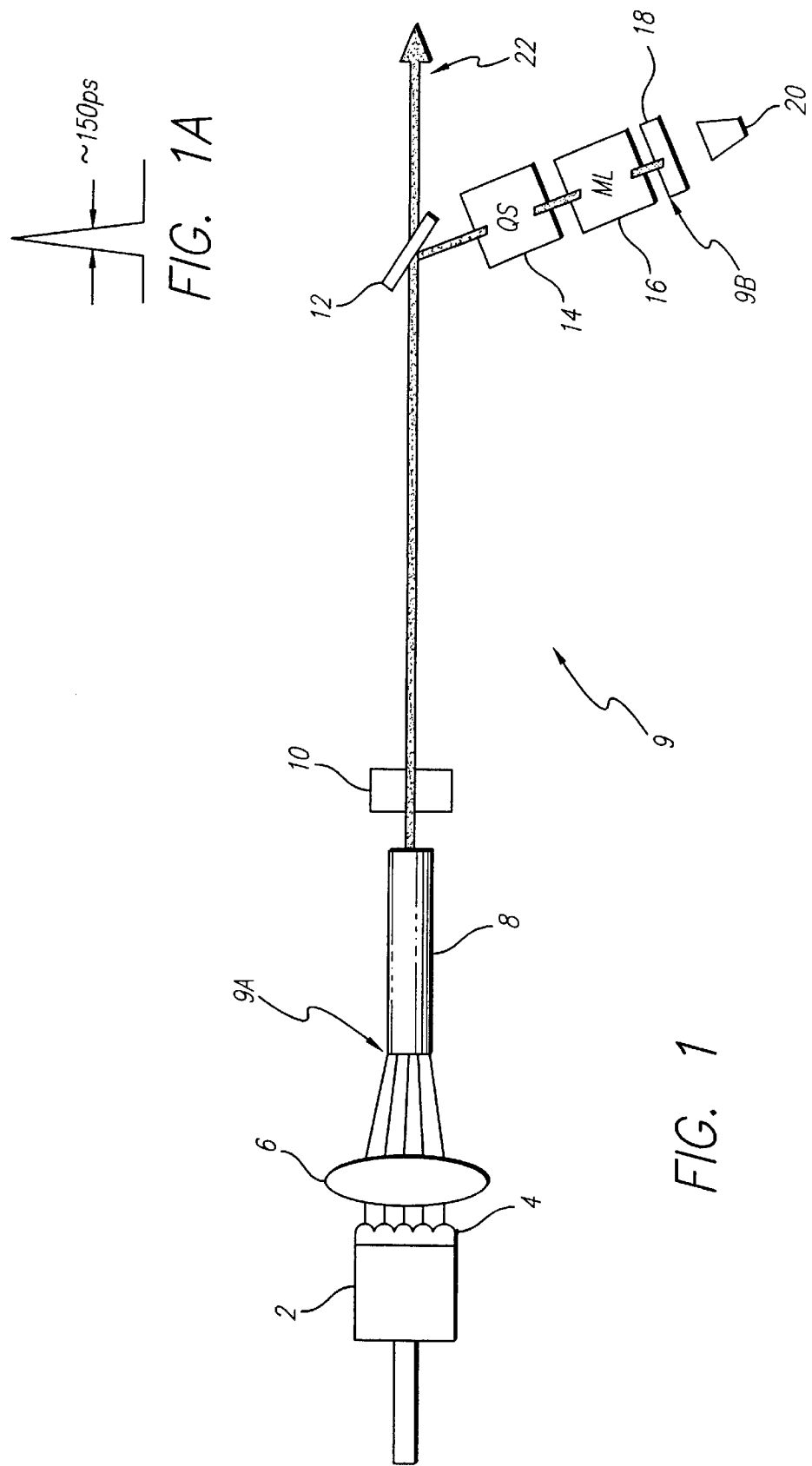
FIG. 1 is a drawing showing the major components of the master oscillator.

FIG. 1 is a schematic diagram of a preferred seed laser system. The principal elements are a diode pumped Nd:YAG rod, a Q-switch controlled resonator, an acousto-optic modelocker for generating very short pulses and a Pockels cell controlled release mechanism.

Laser Crystal and Optical Pump

A Nd:YAG polished rod 8 (3 mm diameter and 2.5 cm long) is longitudinally pumped by a 5 bar laser diode array 2 (SDL part # SDL3245-J5). Diode pump array 2 is quasi-CW and is preferably run at 20% duty factor (200 $\mu$s ON and 800 $\mu$s OFF) and 50 watt average power (at 1 kHz). The diode array wavelength is about 808 nm which corresponds to strong absorption in the Nd:YAG. The output of the pump diodes are collimated by an array of micro-lenses 4. A fast focusing lens 6 concentrates the pump light at the back end of Nd:YAG rod 8. The back surface of the Nd:YAG rod 8 is polished and coated for maximum reflection (~99.8%) at 1064 nm (the lasing wavelength of the Nd:YAG laser) and for high transmission at 808 nm (the pump wavelength). The pump light is trapped in the laser rod via total internal reflection from the polished barrel (similar to a fiber optics) for high pumping efficiency. The front surface of the Nd:YAG rod is cut at ~2 degrees to avoid parasitic oscillations and antireflection (AR) coated for minimal insertion loses at 1064 nm.

It should be appreciated that any suitable laser crystal and optical pump may be used, in addition to the preferred crystal and diode pump described above. For example, other optically pumpable solid state laser materials include Nd:YLF, Yb:YAG, Nd:VO$_4$, Er:YSGG, Er:GGG, Er:YAG and Er,Cr:YSGG crystals and many others. Moreover, other forms of pumps, such as continuous wave, or pulsed may also be used. For example, arc lamps may be used as continuous optical pumps; flash lamps also may be used.

Q-Switch Controlled Resonator

Figure 5A:
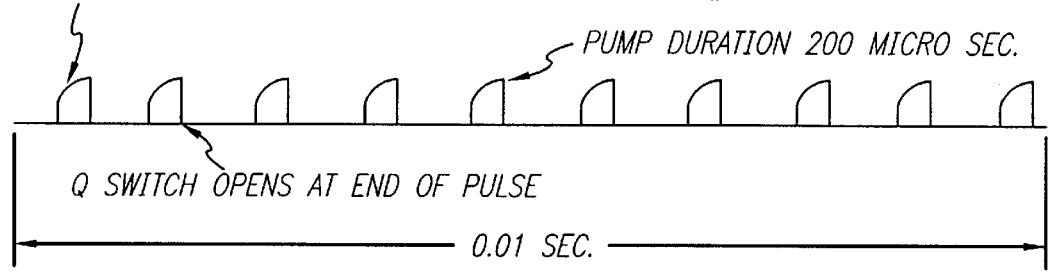
FIGS. 5A, 5B and 5C describe light pulses generated in a preferred embodiment of the present invention.
Figure 5B:
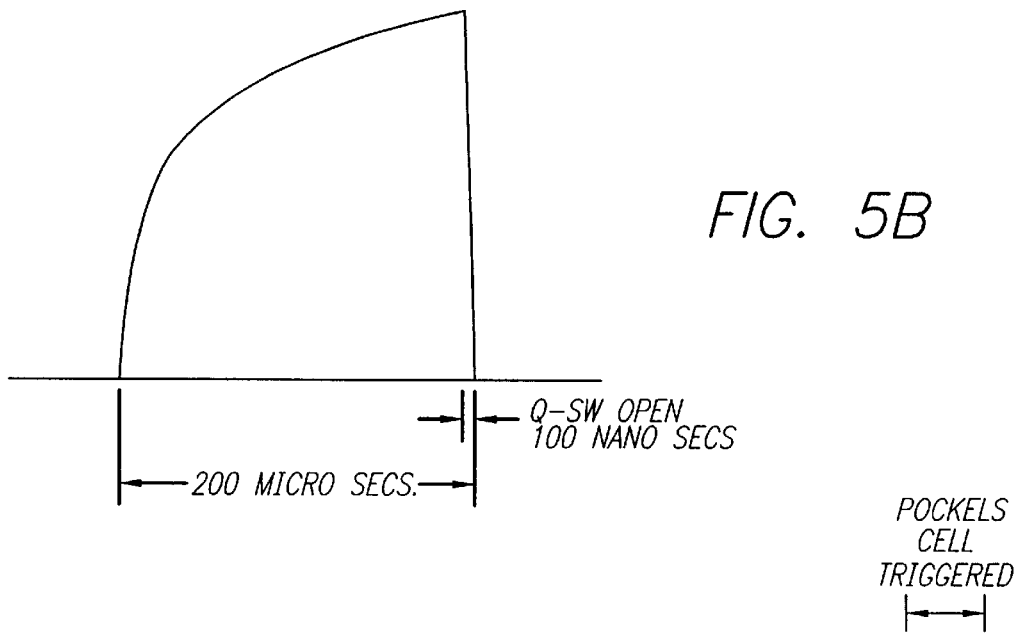

Polarization beam splitter 12 reflect S polarization and transmit P polarization. Acousto-optic Q-switch (Brimrose Model FQQ-27-2-1064) 14 act as an optical shutter which opens for about 100 ns only at the end of the 200 µs pump duration to establish a folded resonator 9 formed between the back surface 9A of Nd:YAG rod 8, the polarization beam splitter 12 and the mirror surface 9B of high reflection 5 m concave mirror 18. Since the Q-switch opens only at the end of the pump pulse for 100 ns, it prevents stimulated laser amplification in resonance cavity 9 except for periods of about 100 ns at the end of each 200 µs pump period. FIG. 5A shows the periodic buildup of energy in the Nd:YAG rod from periodic energy input from the pump diodes. FIG. 5B shows how the Q-switch operates at the end of the 200 µs pump period to permit extraction of the pump energy from the rod.

Formation of Short Pulses with Acousto-Optic Mode Locker

Figure 5C:
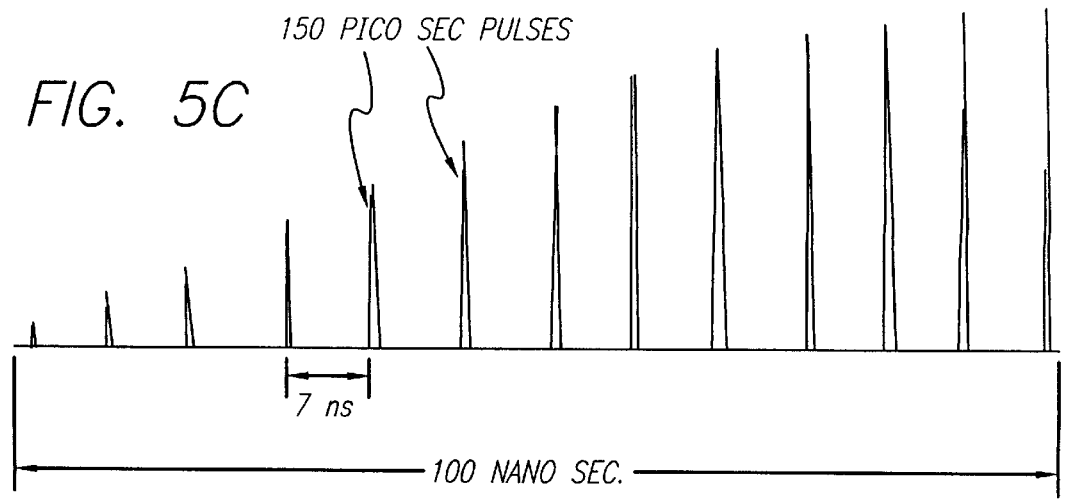

An optical shutter, such as an acousto-optic mode locker (for example, Brimrose Model FSML-70-20-BR-1064) 16 is placed very close to mirror 18. In a typical optimal setting of a mode locker, the RF carrier frequency (f) of the mode locker and the optical length of the laser resonator (L) relate as follows:

f=c/4L where c is the speed of light. In this preferred embodiment, we drive mode locker 16 with 70 MHz RF driver. This produces standing waves in mode locker 16. When the standing waves are zero, the mode locker is transparent for a period of time. In one example, this duration is about 150 ps at a frequency of 140 MHz which is twice the driver frequency. In this example, we provide a cavity length of about 3.5 feet. Thus, mode locker 16 acts as a second optical shutter permitting the passage of a 150 ps (multi-mode) pulse every approximately 7 ns. This 7 ns is the time it takes the 150-ps (about 2-inches long) light pulses to make a round trip from the mode locker through the Nd:YAG rod and back again. Thus, when Q switch 14 is open for about 100 ns at the end of each 200 µs pump period, a single 2-inch long pulse of light is flying back and forth through the 3 ½ foot long resonance cavity 9 between mirror surfaces 9A and 9B and increasing in energy each time it passes through Nd:YAG rod 8. The pulses pass unaffected through Pockels cell 10 (Fast Pulse Technology Model 1041 FV-106) while it is turned OFF. Pockels cell 10 is normally in its OFF condition and it can be turned ON in less then 3 ns to cause a 90 degree rotation of the laser pulse on each double pass of the pulse through the resonance cavity. FIG. 5C demonstrates the buildup of the 150 ps pulse during the 100 ns interval that the Q-switch is ON.

Figure 5D:
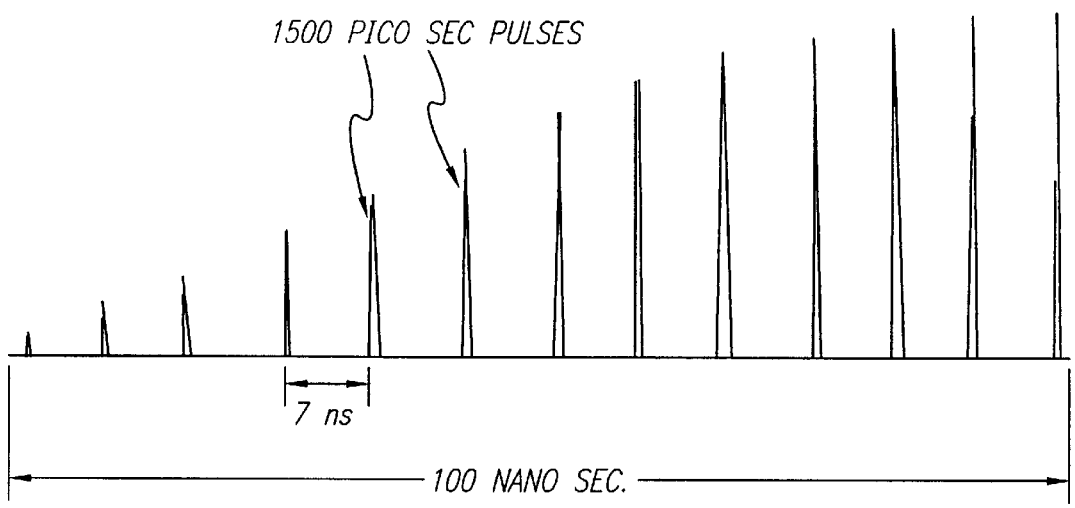
FIG. 5D illustrates light pulse buildup in an embodiment of the present invention.

In another example, other durations are selected by varying the location of the second optical shutter 16, or by adjusting the amplitude of the RF driver. For example, the greater the distance of the mode locker 16 from the rear of the resonator, the shorter the pulse duration. Likewise, the greater the amplitude of the RF driver output, the shorter the pulse duration. It should be understood that any pulse duration achieving sufficient energy levels may be selected using this optical shutter 16. For example the optical shutter 16 may be set to produce a 10 ps pulse length. It also can be set to produce 1500 ps (i.e. 1.5 ns) pulse lengths, or 5000 ps (5.0 ns) pulse lengths. However, the preferred range is 60 ps to 1500 ps. FIG. 5D illustrates the buildup of 1500 ps pulses during the 100 ns pulse is ON in the example discussed above. As illustrated there, there is a 7 ns duration between the center points of each pulse.

Releasing the Pulse with Pockels Cell

Mirror 18 permits a very small portion of the light in the pulse to leak through. The light leaking through is detected by photo-detector 20. When the output of photo-detector 20 exceeds a trigger threshold of a delay generator (not shown), the delay generator triggers the λ/4 Pockels cell 10, which rotates the intra-cavity beam by 90° (2 passes). (In Applicant's preferred embodiment a 70 ns delay time is provided to allow plenty of time for the trigger signal from photo-detector 20 to turn on Pockels cell 10. Thus, the signal from photo-detector 20 is provided to Pockels cell 10 about 70 ns [ten round trips] before the pulse reaches its maximum intensity.) When Pockels cell 10 turns on it changes the polarization of the pulse from S polarization to P polarization as the pulse makes two passes through it suffering two λ/4 retardations. This allows the greatly amplified pulse to escape the resonator through polarizing beam splitter 12 as a single short pulse beam 22 as shown in FIG. 1A. The measured output from this preferred laser system as actually demonstrated by Applicant's prototype system is up to 3 mJ/p.

POWER AMPLIFIER

Many applications may require higher energy per pulse. Laser amplifiers are described below which can increase the energy per pulse while preserving the beam properties of the above described laser beam (various pulse duration examples, and near diffraction limited beam). A beam expander is preferably used to increase the laser beam cross section to match the larger aperture of the power amplifier. Numerous configurations of power amplifiers can be used. We designed and built two types of amplifier modules described below. For pulse energy up to ~50 mJ/p a configuration shown in FIG. 2 is used, and for pulse energy up to ~250 mJ/p the configuration shown in FIG. 3 is used.

Amplification for 50 mJ/p Laser System

Figure 2:
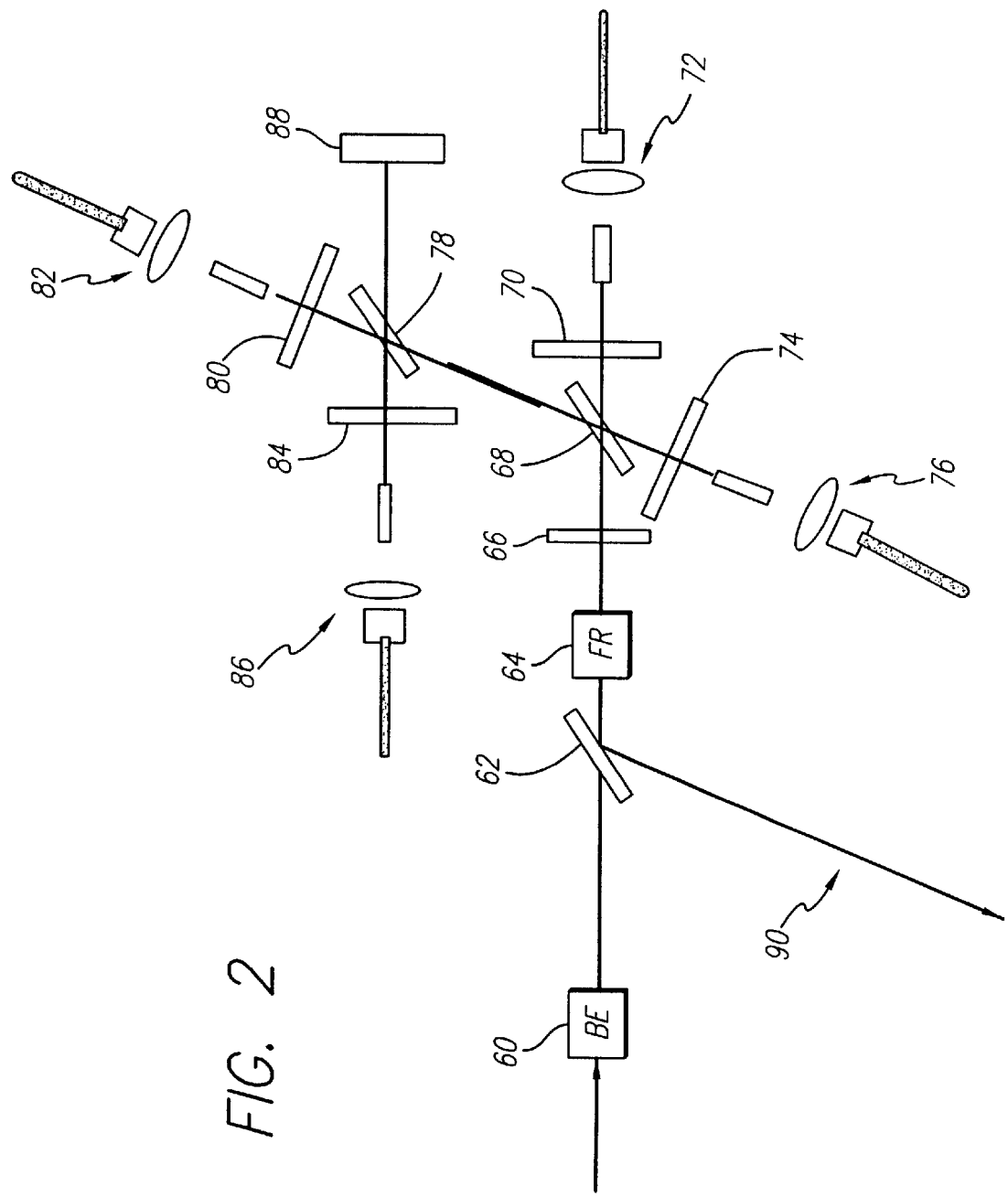
FIG. 2 is a drawing showing the 50 mJ/p amplifiers layout.

The amplifier configuration in FIG. 2 utilizes diode pumped Nd:YAG modules that are identical to the one described in the seed laser system. The beam diameter of the P polarized beam out of the seed system is less than 1 mm. For efficient operation, a beam expander 60 is used to increase the beam diameter to fill the amplifier's aperture. Thin film polarizer 62 transmits the P polarized beam. Faraday rotator 64 rotates the beam by 45°, and λ/2 waveplate 66 rotates the beam back by 45°. The P polarized beam is transmitted through thin film polarizer 68 and through λ/4 waveplate 70 toward amplifier module 72. The amplifier module consist of a 2D diode array with microlenses for the fast axis, a focusing lens for longitudinal pumping of the Nd:YAG rod which is coated on the back for high reflection at 1064 nm and high transmission at 810 nm. The beam thus makes two passes through amplifier module 72 and passes back through λ/4 waveplate 70 for a total rotation of the reflected beam of 90° (two passes). The returned beam (S polarized) reflects off thin film polarizer 68 for a second double pass this time through amplifier module 76 which identical to module 72. The sequence of amplification is: double pass through amplifier modules 72, 76, 82, and 86, and reflection back by highly reflective mirror 88 for a second double pass through amplifiers 86, 82, 76, and 72. The 90° beam rotation of each module is done by the λ/4 waveplates 70, 74, 80, and 84. Thin film polarizers 62, 68, and 78 either transmit or reflect the beam depending on the polarization. After the beam has completed the four passes with amplification in all of the modules, the P polarized beam (going to the left) undergoes 45° rotation in λ/2 waveplate 66, and an additional 45° rotation in Faraday rotator 64 for a total rotation of 90°. The beam 90 reflects off thin film polarizer 62 to exit the amplifier system. In our specific design, each amplifier module can add about 10 to 15 mJ/p for a total of about 50 mJ/p. Thermal analyses using Nd:YAG rods with undoped YAG (~5 mm long) at the longitudinal pumped end, shows that this amplifiers can run at ~1000 Hz with less than 4% loss due to thermal birefringence.

Amplification for 250 mJ/p Laser System

Some applications require higher power amplifiers. Our preferred configuration for a 250 mJ/p system is a four-pass amplification for high extraction efficiency as shown in FIG. 3. This configuration provides ~250 mJ/p at ~1000 Hz. FIG. 3 shows the principal features of the amplifier other than the amplifier pumping equipment. As shown in FIG. 3, the P polarized input beam from the seed laser system shown in FIG. 1 passes through a polarizer beam splitter 30 and undergoes 45° rotation in the Faraday rotator 32 and a −45° rotation in the λ/2 waveplate 34. The P polarized beam passes through polarizing beam splitter 36 for a first pass through the Nd:YAG rods 38 and 42. The 90° rotator 40 cancels thermally induced birefringence, and corrector lens 46 compensates for thermal lensing of the Nd:YAG rods. Mirror 48 folds the beam for a second pass and λ/4 waveplate 44 rotate the polarization to S. The S polarized beam reflects off polarizing beam splitter 36 and folded again by mirror 50 passes for a third pass through the Nd:YAG rods. Mirror 48 folds the beam again for a final fourth pass, and λ/4 waveplate 44 rotates the polarization to P. The P polarized beam passes through polarizing beam splitter 36, and λ/2 waveplate 34 and Faraday rotator 32 provide 90° rotation; therefore, the S polarized beam reflects off polarizing beam splitter 30 to provide the amplifier's output.

The described amplifier configuration has a single pass unsaturated gain (small signal gain) of about 7. However, as saturation is approached, the gain is reduced. In Applicant's prototype demonstration the amplifier was able to deliver about 250 mJ/P with only few mJ/p input.

The amplifier pumping arrangement for the amplifier modules 38 and 42 in FIG. 3 is shown in FIG. 4. (FIG. 4 shows three diode arrays 54, but there are two sets of three arrays for a total of six diode arrays 54 pumping both Nd:YAG rods 38 and 42.) Applicant designed and built transverse pumping (120° apart) units. The slow axis of the 2D laser diode arrays 54 are focused by cylindrical lenses 56 onto the Nd:YAG rods 38 & 42. Water jacket 58 provides for heat removal from the rods. The output of the FIG. 3 amplifier is 250 Watts (average power). This power is in the form of 1000 pulses per second at about 250 mJ/p (~250 mJ/p @ 1 kHz). Each of the Nd:YAG rods are pumped with 60 (50 Wpeak/bar) diode bars operating at 20% duty cycle (200 μs ON and 800 μs OFF). The diode arrays 54 are arranged in 20 bars per array. In this embodiment 3 arrays are provided for each Nd:YAG rod. The Nd:YAG rods are ¼ inch in diameter and 8 cm long. The rods are cut with a slight angle to prevent parasitic amplification. The peak power out of the amplifier is 250 mJ/150 ps which produces $1.7 \times 10^9$ watt pulses. With simple focusing we can exceeds $10^{15}$ watt/cm². In another example, the peak power output of the amplifier is 250 mJ/1500 ps, producing $1.7 \times 10^8$ watt pulses.

EFFICIENT NON-LINEAR OPTICAL CONVERSION

The output of the laser systems described above is at 1064 nm in the infrared. With efficient harmonic generation and sum frequency generation in non linear crystals Applicant has been able to extend the laser wavelength of diode pumped solid state lasers into the visible and the ultra violet (UV). The conversion efficiency depends on the laser and the non linear crystal parameters. Lasers with high peak power and good beam quality are the choice for efficient harmonic generation and sum frequency generation. By applying our picosecond pulse technology we can generate very high peak intensity laser pulses at relatively low energy per pulse. Since the conversion efficiency is proportional to the peak power, E/t (where E is pulse energy and t is pulse duration) and the damage threshold is proportional to $t^{1/2}$, we can apply very high intensities to non-linear crystals for efficient conversion without damaging them.

For example: a typical Q-switched laser has a pulse duration of ~10 ns. A non-linear crystal that can withstand ~1 GW/cm² at 10 ns will be able to withstand ~10 GW/cm² at ~100 ps $[(10 \text{ ns}/100 \text{ ps})^{1/2}=10]$.

Figure 6:
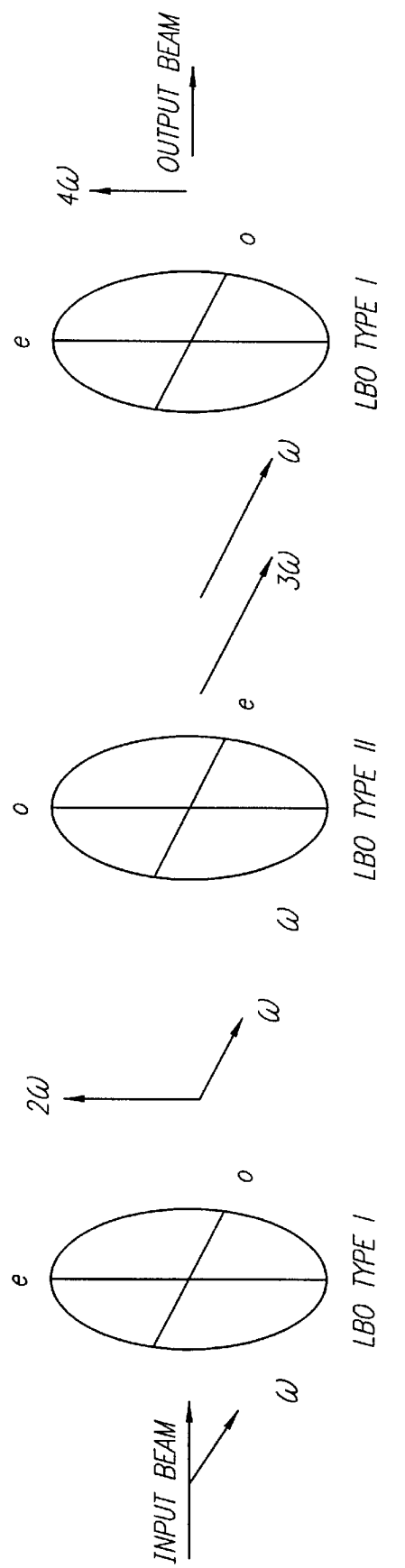
FIG. 6 is a configuration for generating fourth harmonic.

For very high peak intensities short non-linear crystal are preferred for efficient harmonic generation and sum frequency generation (HG & SFG). A shorter crystal is very advantageous for the following reasons:
effective cooling of the crystal
smaller walk off
larger acceptance angle
better match of coherent length
larger acceptance of spectral bandwidth
larger acceptance of thermal deviation
higher optical homogeneity
lower absorption
smaller lensing
smaller birefringence Using Applicant's picosecond laser system, Applicant has demonstrated high conversion efficiency in extra cavity single pass operation: 60% @ 532 nm from 1064 nm (Nd:YAG), 45% @ 355 nm from 1064 nm, and 25% @ 266 nm from 1064 nm. The 266 nm generation was done by SFG of 355 nm and 1064 nm (shown in FIG. 6). Only LBO crystals were used. LBO crystals are superior in their ruggedness for commercial and military applications. Techniques for converting the 1064 nm beam into the shorter wavelengths are well known in the laser art. For example, Chapter 10 of Walter Koechner, Solid-State Laser Engineering, Springer Series, Springer-Verlag Berlin Heidelberg, Germany, provides a good discussion of some of these techniques.

The laser system described in this disclosure with the HG & SFG is a powerful tool for many applications: UV and x-ray (laser plasma generation) lithography, UV short range communication, dentistry and micro-machining to mention few.

MICRO-MACHINING

Continuing miniaturization in electronics, micro-optics and micro-electromechanical systems increases the demand for more efficient, precise and flexible micromachining tools. These tools are needed for material removal such as cutting, drilling, etching and striping. Micro-machining cannot be done with conventional tools (drill, saw, etc.). The ability to focus a laser beam to a very small spot (micrometer size), enables Applicant to perform micro-machining with the laser systems described above. Pulse duration, wavelength, and beam quality are the key laser parameters. Utilization of Applicant's picosecond laser system for material removal is superior to other micromachining lasers for its short pulse duration, efficient conversion to shorter wavelengths, and its near diffraction limited beam.

Short Pulse Duration

Laser ablation occurs when sufficient optical energy is absorbed by a material to bring its temperature to its ablation threshold. The ablation threshold is proportional to $\tau^{1/2}$ (where $\tau$ is the pulse duration) for pulses longer than a few tens of picoseconds (depending on the target material). For very short pulses, the $\tau^{1/2}$ scaling of the ablation threshold changes to a nearly pulse-duration-independent behavior. By shortening the pulse duration from 10 ns (conventional Q-switch laser) to 100 ps (1/100 the duration) the ablation threshold (energy per unit area) would go down by a factor of 10 ($100^{1/2}=10$). The short pulse duration makes it possible to remove material faster than the energy in the material can thermally conduct out of the material being illuminated. Material removal in this pulse width time domain is inherently "cool cutting" since substantially all the material which is heated significantly is removed. For many materials such as copper and gold, reducing the pulse below about 100 to 200 ps does not reduce the pulse energy required for ablation. For other materials such as fused silica, the $\tau^{1/2}$ relationship applies down to a pulse duration of about 10 ps. This feature, negligible temperature rise in the adjacent material during cutting, is important for applications like trimming sensitive components like resistors, capacitors and inductors used in microelectronic circuits, cutting and drilling ceramics and many other applications.

Wavelength

In general, short absorption length will enable more efficient material removal. In most cases, short absorption length occurs at shorter wavelengths. The efficient generation of shorter wavelengths with the above described picosecond laser system is ideal for removing material in micro-machining applications.

Applicant has used the above described laser system for micromachining ceramics (e.g. $Al_2O_3$, AlN, metals, and more). By selecting the proper wavelength, energy per pulse, focusing geometry, and atmospheric gas, we can obtain clean cuts, scribing, or drilling without any slag.

PRECISE AND SAFE TARGET RANGING

By way of example, a 100 ps light pulse is only 1.2 inches in length in air and a 1000 ps light pulse is only 12 inches in long in air. The rise times of such pulses are only a fraction of the pulse duration, therefore, such pulses can obtain sub-inch target range resolution if desired.

For eye safety, wavelengths that are longer than 1.5 $\mu$m are required. One option would be to convert the laser output to longer wavelengths via optical parameter oscillator (OPO). We envision two approaches:

1) Utilizing the above described laser as a single pass through an OPO crystal (e.g. KTP, KTA, etc.) to obtain the signal and idler. Dump the pump and idler wavelengths, and utilize the signal output at greater than 1.5 $\mu$m wavelength.

2) Operating the above described laser in a Q switched mode locked mode to provide synchronous pumping to an OPO crystal, and cavity dumped the signal when it reaches its peak.

Figure 7:
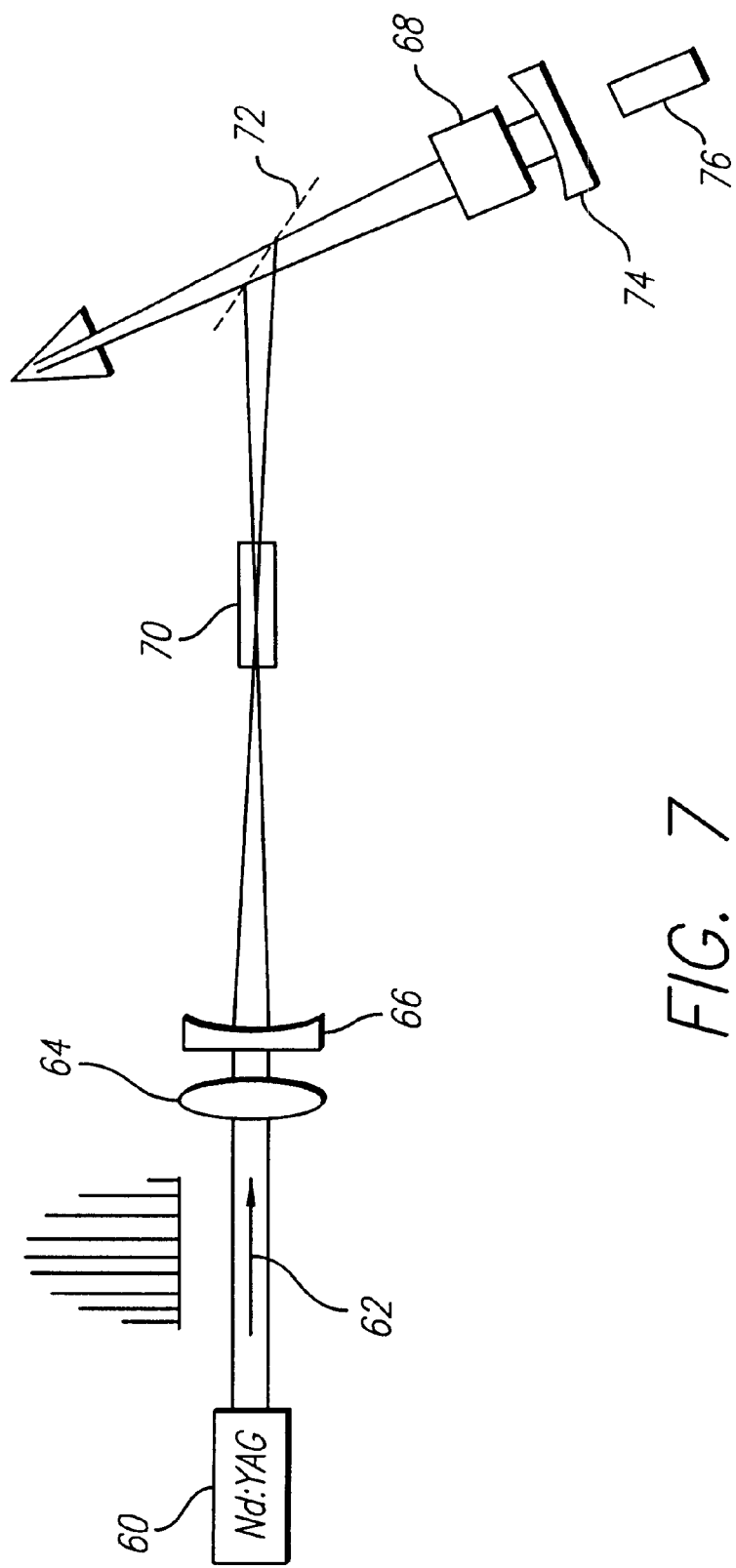
FIG. 7 is a drawing showing a picosecond pulse train pump an OPO.

FIG. 7 is a schematic drawing of the second approach. For example, a mode locked Q switched Nd:YAG laser system 60 (such as is described in FIGS. 1, 3 and 4) is used for pumping an OPO 70. The output of the pump laser 60 is a train of ps pulses 62 under the Q switch envelop. The separation between the ps pulses is the round trip time of the resonator (in our case ~7 ns). The pump beam is focused by a long focal length lens 64 (~1 m) onto the non linear OPO crystal 70 (15 mm long KTP in this case). The OPO resonator comprises mirrors 66 & 74 which are separated to give the same optical path length as the pump laser resonator (synchronous pumping). Mirror 66 is highly reflective to 1.5 $\mu$m and highly transmissive to 1064 nm (Nd:YAG pump), and mirror 74 is highly reflective to 1.5 $\mu$m. Polarizer 72 form a fold in the resonator. It is highly transmissive to polarization in the plane of the paper (P polarization), and highly reflective in the plane perpendicular to the paper (S polarization). Pockels cell 68 can be turned on very fast (~3 ns) to introduce $\lambda/4$ wave retardation. Photo detector 76 (~1 ns response time) can detect small light leakage through mirror 74. The KTP crystal is cut for phase matching ~1.5 and 3.6 $\mu$m from 1064 nm. It is also oriented so that the 1.5 $\mu$m is S polarized. The picosecond OPO pulse inside the resonator builds up in synchronous with the pump beam every round trip. The photo detector detect the pulse train, triggers a delay generator that triggers the Pockels cell to turn ON. By adjusting the proper delay, the Pockels cell will turn ON when the ps OPO pulse is at its maximum. The two passes through the Pockels cell rotates the polarization by 90° (to P) and the entire pulse exit the resonator (cavity dumping) as a single ps pulse at 1.5 $\mu$m.

While the above description contains many specificities, the reader should not construe these as limitations on the scope of the invention, but merely as exemplifications of preferred embodiments thereof. For example, persons skilled in the laser art will recognize that short duration pulses at a great many different wavelengths can be generated using various combinations of HG, SFG and OPO optical elements. These ps pulses can be used, for example, for remote sensing of atmospheric gases and other elements. Cross ps beams can be used to produce 3-D images. The beam can be used for 3-D target ranging for very accurate range measurements.

Persons skilled in the art will also recognize that the diode pump lasers can be replaced with suitable arc lamps and flash lamps. The pumping arrangement could be continuous (CW) instead of periodic as specifically described above. In the continuous case the pulses shown in FIG. 5A would be side-by-side without any significant dead time. The preferred embodiment described by reference to FIG. 1 would provide 1000 pulses per second, each pulse spaced about 1/1000 second apart. By making the cavity length 7 feet instead of 3.5 feet, we would permit two pulses to build up in the cavity at the same time, spaced about 7 ns apart. These pulses could be released together so that the output of the laser system would be a series of pulses in which two pulses at 7 ns intervals would be released at the rate of 1 KHz.

Thus, it is seen that a short pulse length laser system is provided. One skilled in the art will appreciate that the present invention can be practiced by other than the embodiments which are presented in this description for purposes of illustration and not of limitation, and the present invention is limited only by the claims which follow. It is noted that equivalents for the particular embodiments discussed in this description may practice the invention as well. Accordingly, the scope of the invention is determined by the claims that follow and their legal equivalents, and not by the examples which have been given.

What is claimed is:

1. A short pulse laser system comprising:
   a laser crystal;
   an optical pump arranged to pump said laser crystal;
   a resonator defining a beam path;
   a first optical shutter installed within said resonator and blocking passage of light in said resonator except for defined periods of time, said first optical shutter defining an ON period and an OFF period;
   a second optical shutter installed within said resonator blocking the passage of light in said resonator except for periodic predetermined intervals, such that during said ON period a light pulse in said resonator is able to make at least one transit through said laser crystal, whereby said periodic predetermined interval determines a pulse length under 5000 picoseconds and said light pulse increases in intensity on each transit, creating an intensified pulse; and
   an optical release mechanism releasing said intensified pulse from said resonator.

2. A short pulse laser system as in claim 1 wherein said second optical shutter is installed within said resonator for blocking the passage of light in said resonator except for periodic intervals, said intervals being spaced such that during each ON period a light pulse traveling at the speed of light in said resonator is able to make a plurality of transits through said resonator, increasing in intensity on each transit to define an intensified pulse.

3. A short pulse laser system as in claim 1 wherein said second optical shutter is installed within said resonator for blocking the passage of light in said resonator except for periodic intervals under five nanoseconds.

4. A short pulse laser system as in claim 1 wherein said second optical shutter is installed within said resonator for blocking the passage of light in said resonator except for periodic intervals in the range of 10 picoseconds to five nanoseconds.

5. A short pulse laser system as in claim 1 wherein said second optical shutter is installed within said resonator for blocking the passage of light in said resonator except for periodic intervals in the range of 10 picoseconds to 1500 picoseconds.

6. A short pulse laser system as in claim 1 wherein said second optical shutter is installed within said resonator for blocking the passage of light in said resonator except for periodic intervals in the range of 60 picoseconds to 1500 picoseconds.

7. A short pulse laser system as in claim 1 wherein said second optical shutter is a mode locker.

8. A short pulse laser system as in claim 1, wherein said optical pump includes a continuous wave optical pump.

9. A short pulse laser system as in claim 1, wherein said optical pump includes a flash lamp.

10. A short pulse laser system as in claim 1, wherein said optical pump includes an arc lamp.

11. A short pulse laser system as in claim 1, wherein said optical pump includes at least one laser diode array.

12. A short pulse laser system as in claim 1, wherein said optical pump includes at least one laser diode array controlled to periodically pump said laser crystal to define pumping periods.

13. A short pulse laser system as in claim 1, wherein said optical pump includes at least one laser diode array controlled to continuously pump said laser crystal.

14. A short pulse laser system as in claim 1 further comprising a laser amplifier for amplifying said intensified pulses.

15. A short pulse laser system as in claim 14 wherein said laser amplifier comprises a plurality of diode pumped laser crystal rods.

16. A short pulse laser system comprising:
    a laser crystal;
    an optical pump arranged to pump said laser crystal;
    a resonator defining a beam path, said laser crystal positioned within the beam path;
    a first optical shutter means for blocking passage of light in said resonator except for defined periods of time; and
    a second optical shutter means for blocking the passage of light in said resonator except for periodic predetermined intervals, such that during least one of said defined periods of time, a light pulse in said resonator is able to make at least one transit through said laser crystal, whereby said periodic predetermined interval determines a pulse length under 5000 picoseconds and said light pulse increases in intensity on each transit, creating an intensified pulse; and
    an optical release means said intensified pulse from said resonator.

17. A short pulse laser system as in claim 16 wherein said second optical shutter means includes a means for blocking the passage of light in said resonator except for periodic intervals, said intervals being spaced such that at least one light pulse traveling at the speed of light in said resonator is able to make a plurality of transits through said resonator, increasing in intensity on each transit.

18. A short pulse laser system as in claim 16 wherein said second optical shutter means includes means for blocking the passage of light in said resonator except for periodic intervals under five nanoseconds.

19. A short pulse laser system as in claim 16 wherein said second optical shutter includes means for blocking the passage of light in said resonator except for periodic intervals in the range of 10 picoseconds to five nanoseconds.

20. A short pulse laser system as in claim 16 wherein said second optical shutter includes means for blocking the passage of light in said resonator except for periodic intervals in the range of 10 picoseconds to 1500 picoseconds.

21. A short pulse laser system as in claim 16 wherein said second optical shutter includes means for blocking the passage of light in said resonator except for periodic intervals in the range of 60 picoseconds to 1500 picoseconds.

22. A short pulse laser system as in claim 16, wherein said optical pump means includes a continuous wave optical pump means.

23. A diode pumped solid state short pulse laser system comprising:

a Nd:YAG rod;

a diode array arranged to pump said Nd:YAG rod;

a Q-switch controlled resonator comprising:
   a Q-switch,
   at least two reflecting surfaces defining said resonator, said Q-switch defining an ON period and an OFF period, and
   a polarization beam splitter;

an acousto-optic window installed within said resonator for blocking the passage of light in said resonator except for periodic intervals under five nanoseconds, said intervals being spaced such that at least one light pulse defining a polarization and traveling at the speed of light in said resonator is able to make a plurality of transits through said resonator, increasing in intensity on each transit; and a polarization rotator periodically rotating the polarization of said at least one pulse to permit pulses to be released from said resonator in a pulsed beam to define an intensified pulse laser beam.

\* \* \* \* \*